(12) United States Patent
Malkamaki (10) Patent No.: US 8,532,690 B2
(45) Date of Patent: *Sep. 10, 2013

(54) UPLINK CONTROL CHANNEL TRANSIT POWER CONTROL BASED ON RECEIVED TRANSMISSION

(75) Inventor: Esa Malkamaki, Espoo (FI)

(73) Assignee: Nokia Corporation, Espoo (FI)

( * ) Notice: Subject to any disclaimer, the term of this patent is extended or adjusted under 35 U.S.C. 154(b) by 139 days.

This patent is subject to a terminal disclaimer.

(21) Appl. No.: 13/194,478

(22) Filed: Jul. 29, 2011

(65) Prior Publication Data

US 2011/0280171 A1 Nov. 17, 2011

Related U.S. Application Data

(60) Continuation of application No. 12/318,854, filed on Jan. 9, 2009, now Pat. No. 8,014,812, which is a division of application No. 10/473,221, filed as application No. PCT/IB02/02035 on Mar. 28, 2002, now Pat. No. 7,496,374.

(30) Foreign Application Priority Data

Mar. 28, 2001 (GB) .................................. 0107746.0

(51) Int. Cl.
*H04W 52/16* (2009.01)
*H04W 52/32* (2009.01)

(52) U.S. Cl.
USPC ............................................ 455/522; 455/69

(58) Field of Classification Search
None
See application file for complete search history.

(56) References Cited

U.S. PATENT DOCUMENTS

| 5,267,262 A | 11/1993 | Wheatley, III |
| 5,487,174 A | 1/1996 | Persson |
| 5,507,018 A | 4/1996 | Seppalä |
| 5,828,695 A | 10/1998 | Webb |
| 5,966,384 A | 10/1999 | Felix et al. |

(Continued)

FOREIGN PATENT DOCUMENTS

| EP | 0 964 541 | 12/1999 |
| EP | 0836770 B1 | 9/2002 |

(Continued)

OTHER PUBLICATIONS

English language version of Grounds of Opposition issued by the Korean Intellectual Property Office on Dec. 14, 2006.

(Continued)

*Primary Examiner* — Philip Sobutka
(74) *Attorney, Agent, or Firm* — Squire Sanders (US) LLP (57) ABSTRACT

A method and device are configured to receive, in simultaneous communication with stations via a wireless interface power control, commands from the stations. The method and device are configured to receive from a control unit further control information associated with a transmission parameter for use by the device for one or more transmissions to one of the stations other than the station that received transmissions from the device with a best quality parameter. The method and device are also configured to control one or more transmissions from the device to the one of the stations on the basis of a power control command from the station that receives transmissions from the device with the best quality parameter, and on the basis of the further control information received from the control unit. The further control information comprises a control command selected from control commands by the control unit.

60 Claims, 3 Drawing Sheets

(56) References Cited

U.S. PATENT DOCUMENTS

| | | | |
|---|---|---|---|
| 5,991,618 | A | 11/1999 | Hall |
| 5,991,627 | A | 11/1999 | Honkasalo et al. |
| 6,173,162 | B1 | 1/2001 | Dahlman et al. |
| 6,175,745 | B1 | 1/2001 | Bringby et al. |
| 6,176,162 | B1 | 1/2001 | Ludwig et al. |
| 6,212,399 | B1 | 4/2001 | Kumar et al. |
| 6,498,785 | B1 | 12/2002 | Derryberry et al. |
| 6,522,892 | B1 | 2/2003 | Taniguchi |
| 6,678,523 | B1 | 1/2004 | Ghosh et al. |
| 6,765,883 | B1 | 7/2004 | van Heeswyk |
| 7,496,374 | B2 * | 2/2009 | Malkamaki ................ 455/522 |

FOREIGN PATENT DOCUMENTS

| | | |
|---|---|---|
| JP | 07-500469 | 1/1995 |
| JP | 7274236 | 10/1995 |
| JP | 10-013922 | 1/1998 |
| JP | 11-355854 | 12/1999 |
| JP | 2000-49663 A | 2/2000 |
| JP | 2000-261374 | 9/2000 |
| JP | 2001-016166 | 1/2001 |
| JP | 2001-069077 | 3/2001 |
| JP | 2001-016162 | 1/2011 |
| KR | 2000-0001147 | 1/2000 |
| KR | 2000-0013205 | 3/2000 |
| WO | 98/36508 | 8/1998 |
| WO | 98/56120 | 12/1998 |
| WO | 99/49610 | 9/1999 |
| WO | 9949595 A1 | 9/1999 |
| WO | 9953629 A2 | 10/1999 |
| WO | 00/10348 | 2/2000 |
| WO | 0007377 A2 | 2/2000 |
| WO | 00/21236 | 4/2000 |
| WO | 0041466 A2 | 7/2000 |
| WO | 00/74292 A1 | 12/2000 |
| WO | 01/95521 A2 | 12/2001 |
| WO | 02/01893 A2 | 1/2002 |

OTHER PUBLICATIONS

Bruneel, et al., "On the Throughput Performance of Some Continuous ARQ Strategies with Repeated Transmissions," Mar. 1986, IEEE Transactions on Communications, vol. COM-34, No. 3, pp. 244-249.
Office Action issue Jan. 20, 2011 for corresponding Japanese Patent Application No. 2009-029530.
Japanese Office Action application No. 2009-029530 dated Aug. 11, 2011.
Bakhtyari et al., "Pratical Implementation of a Mobile Data Link Protocol with a Type II Hybrid ARQ Scheme and Code Combining," Personal Communication—Freedom Through Wireless Technology, May 18-20, 1993, Proceedings of the Vehicular Technology Conference, vol. Conf. 43, May 18, 1993, pp. 774-777.
Salonaho et al., "Flexiable Power Allocation for Physical Control Channel in Wideband CDMA," Radio Access Systems, Nokia Telecommunication, 1999 IEEE, pp. 1455-1458.
Japanese Office Action dated Mar. 15, 2012 in corresponding JP2009-029530 (translation only).

* cited by examiner

Fig. 1

PC commands from BS2    PC commands from BS1    PC commands from BS2

UPLINK CONTROL CHANNEL TRANSIT POWER CONTROL BASED ON RECEIVED TRANSMISSION

CROSS REFERENCE TO RELATED APPLICATIONS

This application is a continuation application of U.S. patent application Ser. No. 12/318,854, filed Jan. 9, 2009, which is a divisional application of U.S. patent application Ser. No. 10/473,221, filed on Nov. 14, 2003, which is a national stage application of International Application PCT/IB02/02035, filed on Mar. 28, 2002. The disclosures of the prior applications are hereby incorporated by reference herein in their entirety.

FIELD

The present invention relates to a communication system, and in particular, but not exclusively, to transmissions between stations of a communication system.

BACKGROUND

Various different communication systems adapted to provide wireless communication between two or more stations are known. Wireless communication media may be provided between a station of a communication network and a user equipment. Wireless communication media may also be provided between two user equipment or between two stations of a communication network.

A wireless communication systems may be used for various types of communication, such as for voice communication or data communication. A wireless system may provide circuit switched or packet switched services or both. In packet switched services data (e.g. speech data, user data, video data or other data) is communicate in data packets. The development in the wireless communication has lead to systems that are capable of transporting data in substantially high data rates i.e. the so called high speed data (HSD).

An example of wireless communication systems is a cellular communication system. In a cellular system the user equipment may access the communication network via access entities referred to as cells, hence the name cellular system. The skilled person knows the basic operational principles and elements of a cellular network and these are therefore not explained herein in any greater detail. It is sufficient to note that a cell can be defined as an radio access entity that is served by one or several base stations (BS) serving user equipment (UE) via a wireless interface therebetween. Examples of the cellular networks include networks that are based on access systems such as the CDMA (Code Division Multiple Access), WCDMA (Wide-band CDMA), TDMA (Time Division Multiple Access), FDMA (Frequency Division Multiple Access), or SDMA (Space Division Multiple Access) and hybrids thereof.

A wireless communication system is typically provided with a radio resource management function. A feature of the radio resource management is that it may continuously adjust the use of resources such as the power levels between a base (transceiver) station and user equipment associated with said base station during communication between the base station and the user equipment. Use of radio resources may be controlled for transmissions that occur from the base station towards the user equipment (downlink) and from the user equipment towards the base station (uplink). The adjustment is done in order to provide a sufficient quality and reliability for the transmission between the base station and the user equipment in various conditions and, on the other hand, to reduce power consumption and interference caused by the communication to other devices.

Figure 1:
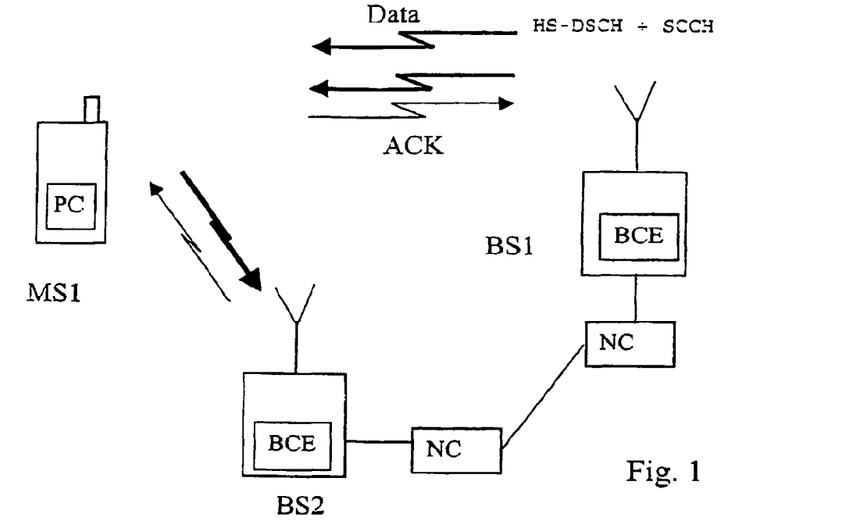
FIG. 1 shows an access system wherein the present invention may be embodied.
Figure 2:
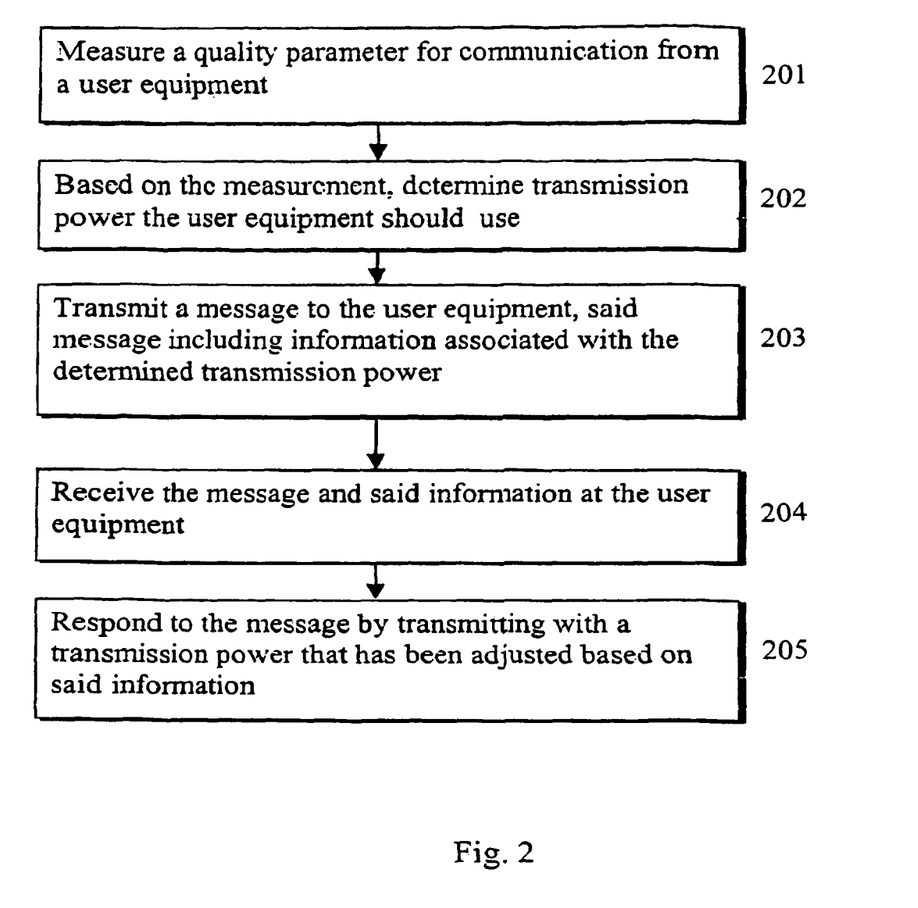
FIG. 2 is a flowchart illustrating the operation of an embodiment of the present invention.

A user equipment may communication simultaneously with a number of base stations. FIG. 1 shows an example where a user equipment MS1 is in communication with two base stations BS1, BS2. The simultaneous communication with a plurality of base stations may occur, for example, when a user equipment is to be handed over from a base station to another base station.

The handover may be performed by means of the so called soft handover procedure. For example, in the CDMA soft handover may be used to reduce the interference caused by the user equipment. During a soft handover the transmission power of a user equipment is typically adjusted based on power control commands from a base station that request for the lowest transmission power. Each base station involved in the soft handover measures the quality of the signal from a given user equipment and sends its power control commands to the user equipment asking the power up or down. The user equipment increases its transmission power only if all base stations involved in the soft handover request for more power.

The user equipment may receive data such as control messages, user data and so on from a base station. The user equipment may receive data from more than one base station. Some of these data transmissions may need to be responded by the user equipment. The response may, for example, be an acknowledgement that the user equipment did receive the message and/or that the user equipment did accomplish a task in response to the message and/or a response to an inquiry and/or any other feedback that may be required by the base station. The following will discuss a more detailed example that relates to acknowledgements in a third generation wide-band code division multiple access (3G WCDMA) system.

In WCDMA based systems the above referred high speed data may be enabled e.g. by means of the so called high speed downlink packet access (HSDPA) technology. The high speed downlink packet access (HSDPA) may include functions such as fast hybrid automatic repeat request (HARQ), adaptive coding and modulation (AMC) and/or fast cell selection (FCS). These functions are known by the skilled person and will thus not be explained in more detail. A more detailed description of these and other function of the HSPDA can be found e.g. from a third generation partnership project technical report No. 3G TR25.848 release 2000 titled 'Physical Layer Aspects of UTRA High Speed Downlink Packet Access'. It shall be appreciated that although the HSDPA has been specified for use in the WCDMA, similar basic principles may be applied to other access techniques.

At the present it is assumed that in the high speed downlink packet access (HSDPA) each user equipment receiving data on a high speed downlink shared channel (HS-DSCH) also has an associated dedicated channel (DCH) allocated. The dedicated channel may be mapped to a dedicated physical channel (DPCH) in the physical layer. The DPCH is typically divided into dedicated physical data channel (DPDCH) and dedicated physical control channel (DPCCH) both in the uplink and the downlink. Data such as the power control commands, transport format information, and dedicated pilot symbols are transmitted on the DPCCH. Information such as diversity feedback information may also be transmitted on DPCCH in the uplink. The HS-DSCH may be mapped to one or several high speed physical downlink shared channels (HS-PDSCH) in the physical layer.

The associated dedicated channel is typically provided both in the downlink and the uplink. The dedicated channel is typically used to carry HSDPA related information/signalling as well as other dedicated data such as speech and control data. The user equipment may communicate with several base stations at the same time. For example, the associated dedicated channel may be in soft handover.

In addition to associated dedicated channels, the HS-DSCH may be associated also with a shared control channel (SCCH). The SCCH can be used to carry HS-DSCH specific information/signalling to those users receiving data on the HS-DSCH.

A current proposal is to use the dedicated channel to inform the user equipment that it has data to be read on the HS-DSCH and SCCH. That is, only those users receiving data at a given time will receive an indication on the dedicated channel. The dedicated channel may be called as a pointer channel since it points to the shared channels. The dedicated channel may also contain information about modulation and coding schemes, power levels and similar parameters used for the shared channels. This information can be sent also on the shared channel. The shared control channel on the other hand is used to carry information that is specific to the data transmitted on the shared data channel (HS-DSCH). This information can contain for instance packet numbers for the HARQ and so on. The shared control channel can be sent on a separate code channel (code multiplexed) or using the same code channels as HS-PDSCH (time multiplexed).

Unlike the dedicated channel, the HS-DSCH is assumed not to be in soft handover. That is, each base station is assumed to have their own shared channel and the user equipment is assumed to receive data from only one base station at a time. The so called fast cell selection (FCS) technique may be used to switch the data transmission from one base station to another. However, the shared channels does not use power control. Instead, the shared channels are proposed to be transmitted with fixed or semi-fixed power. The term 'semi-fixed' means in here that the power is not changed often. The power could, for instance, be a cell specific parameter.

In the currently proposed arrangements the high speed downlink shared channel (HS-DSCH) is planned to be associated with a dedicated channel which would carry in the downlink at least information regarding the timing when the receiving station is to receive on a shared channel. The associated dedicated channel may possibly carry also other information. In the uplink, the associated dedicated channel may carry, for example, the required acknowledgements (ACK) for a fast HARQ.

The inventor has found that this way be problematic for example in the context of the uplink power control of the fast HARQ acknowledgements. A problematic situation may occur especially when the associated dedicated channel is in the soft handover mode. During the soft handover the uplink power is adjusted in accordance with the best quality uplink among an active set of base stations. However, signalling on the high speed shared channel may be transmitted from another base station. The communication link between the user equipment and said other base station may be of poorer quality than said best uplink connection. Nevertheless, said other base station expects to receive responses such as an acknowledgement from the user equipment. Since the quality of this uplink connection may be of substantially poorer quality than what the best uplink is, there is a risk that the response is not properly received and decoded or is not received at all.

The fast cell selection function may be used to guarantee in some occasions that best possible downlink is utilised for communication towards the user equipment. However, the base station that provides the best uplink may be different than the base station providing the best downlink. This may be so, for example due to fast fading or other changes in the signalling conditions. This may increase the unreliability of the responding functionality.

The prior art proposals for solving this problem include so called strong coding, e.g., by using repetition coding. In the repetition coding the acknowledgement (ACK) bit or bits is/are repeated several times. This, however, may cause too much additional load on the air interface and/or reserve too much of the radio resources if one wants to guarantee the correct reception of the acknowledgement message.

Another prior art proposal is the so called fixed power offset for acknowledgement (ACK) transmissions. This means that all acknowledgement messages are transmitted with increased or a certain power in order to ensure that the acknowledgement is received even through the poorest quality uplink. However, even a fixed power level for acknowledgement messages may not completely solve the problem of substantially poor signalling conditions. Thus situations where the power is not high enough may still occur. On the other hand, it is also possible that the fixed power level is unnecessarily high. Thus, in addition to reliability problems this approach may be disadvantageous in that too high power is used by the user equipment causing interference and unnecessarily high power consumption.

SUMMARY

Embodiments of the present invention aim to address one or several of the above problems.

According to one aspect of the present invention, there is provided a method for communication between a first station and a second station, comprising: communicating from the first station to the second station information associated with the manner how the second station should transmit towards the first station; and transmitting from the second station based on said information from said first station instead of transmitting in a manner the second station would have transmitted had it not been provided with said information.

In a specific embodiment said information is transmitted on a dedicated channel from the first station to the second station.

In another specific embodiment said information is communicated in a message that is transmitted from the first station to a second station. A response to the message is then transmitted from the second station based on said information.

The second station may transmit with a transmission power that has been set based on said information after having received the information.

The second station may repeat the transmission, the number of transmissions depending on said information.

Said information may define an offset parameter, the power level of the transmission being shifted an amount as indicated by said offset parameter for the transmission.

In an additional step the quality of the interface between the first and second stations is determined. The information to be transmitted to the second station is then defined by the first station based on said determination.

The second station may be in communication with at least one further station, said further station providing control instructions to the second station. The second station may be involved in a handover between said at least two stations. The second station may be in a soft handover mode.

According to another aspect of the present invention there is provided a communication system comprising: a station; a user equipment for communication with the station via a wireless interface, said user equipment being adapted to control at least one transmission parameter; and control means adapted for provision said user equipment with information associated with a transmission parameter for use by the user equipment when transmitting to the station, the user equipment being enabled to transmit with a different transmission parameter based on said information than what the transmission parameter would be if the user equipment had not been provided with said information.

At least one further station may be provided, said further station being adapted for communication with the user equipment, the arrangement preferably being such that the user equipment is adapted to follow control instructions from said further station unless said information is provided thereto.

According to another aspect of the present invention there is provided a station for a communication system comprising control means for generating a message to be communicated from the station to another station, said control means being adapted to provide said other station with information associated with a parameter for use by said other station for use in control of communication from said other station to the station when responding the message.

According to another aspect of the present invention there is provided a user equipment for communication with a station of a communication system via a wireless interface, comprising means for receiving a message from the station and control means for transmitting a response to the message, wherein the user equipment is adapted to transmit the response in accordance with control information received with the message.

BRIEF DESCRIPTION OF THE DRAWINGS

For better understanding of the present invention, reference will now be made by way of example to the accompanying drawings in which.

DESCRIPTION OF THE PREFERRED EMBODIMENTS

An embodiment will now be described with reference to a mobile telecommunication system. The exemplifying communication system comprises a radio access part adapted to operate based on the WCDMA (Wideband Code Division Multiple Access) technique. A feature of the WCDMA based systems is that a plurality of user equipment is allowed to communicate with a base transceiver station in a cell over a radio interface (only one user equipment, however, is shown in FIG. 1 for clarity). As shown by FIG. 1, a user equipment is also allowed to be in radio communication with more than one base station at the same time. FIG. 1 shows only two base stations BS1, BS2 for clarity.

The user equipment comprises a mobile station MS1. The term mobile station refers to a mobile user equipment that is enabled to move from a location to another. A mobile station may also roam from one network to another network, if the other network is compatible with the standard the given mobile station is adapted to and there is a roaming agreement between the operators of the two networks.

Each of the base stations BS1, BS2 may be provided with a controller entity BCE. The controller entity may be adapted to perform various task, such as to measure and control power levels that are used for communication between the base station and the mobile station MS1. In addition to the controller entity of the base station, the operation of the base station may also be controlled by at least one further controller entity, such as a radio network controller NC. The arrangement is typically such the various control functions associated with a base station are divided between the controller entity of the base station and a network controller entity. A network controller entity may be adapted to control one or several base stations. The various network controller entities may be connected to each other for communication therebetween.

Communication between the mobile station and the base stations may comprise any kind of data such as speech data, video data or other data. The base stations and mobile station communicate also control data. The control data may associate with management operations. The control data may comprise messages such as various request and acknowledgements.

Data may be transmitted between the stations as a plurality of data symbols in subsequent data or radio frames. The signals carrying the data may be transmitted with variable data symbol transmission rates (data speeds), wherein the transmission rate may be different in subsequent frames of the transmission. The data symbols may be transmitted based on different access techniques. For example, in the CDMA (Code Division Multiple Access) system data is encoded for transmission by processing data symbols to be transmitted by a spreading code for each transmission channel. In the TDMA (Time Division Multiple Access) system data is transmitted in different time slots allocated for different channels.

The communication between the mobile station MS1 and the base stations BS1 and BS2 may occur via different communication channels, such as via a dedicated channel, shared channel and so on. In some systems such as the CDMA the channels may be distinguished from one another by the use of scrambling codes in a manner which is known by the skilled person.

In FIG. 1 the different signalling conditions between the mobile station and the base stations are illustrated by different widths of the arrows between the stations. As shown, base station BS1 has a weaker uplink with the mobile station MS1 than the other base station BS2. This implies that the power control of the uplink follows the base station BS2. However, as shown in FIG. 1, the downlink from base station BS1 may be stronger than what the downlink from the base station BS2 is.

Each of the base stations of FIG. 1 may be enabled to measure one or more parameter that associate with the connection. The parameter may be a quality parameter such as the power levels or signal to interference (SIR) level in the uplink. That is, the power level or SIR level at which each base station BS1, BS2 receives from the mobile station MS1 may be known by the respective base station.

The power control mechanism in the access network is typically such that the mobile station MS1 follows the power commands received from the "strongest" base station, e.g. the base station BS2 that receives the signal transmitted by MS1 with the best quality parameter. The transmission power of the mobile station MS1 is then adjusted accordingly even if the other base station BS1 keeps on asking for more transmission power. This is so since the mobile station MS1 only increases transmission power if all those base stations that are in soft handover with the mobile station MS1 ask for more power.

In the following example it is assumed that in normal operation the mobile station MS1 adjusts it transmission power based on the power commands received from the base station BS2. The power adjustment mechanism may be based on use of the so called quality target or power threshold values. If the quality of the connection is below the target value, the mobile station MS1 is asked to increase the transmission power and if the quality is above the target, the power is asked to be decreased.

The connection quality target can be announced e.g. by means of so called Eb/No (Signal Energy/Noise) or SIR (Signal to Interference Ratio) or desired signal level target or a similar parameter indicating a quality measure which can be estimated for the connection between two stations.

The quality of the connection is controlled based on the target value. Any of the connection parameters that have influence to the quality of the connection should follow any changes in the target. In most cases it is sufficient if the transmission power is increased/decreased in order to meet the quality target value. A more detailed description of a possible closed loop power control mechanism can be found, for example, from 3GPP (third generation partnership project) technical specification No. TS25.214 "Physical layer procedures (FDD)".

In addition to the closed loop power control mechanism the CDMA systems may include also an outer loop power control mechanism. This may adjust the power or SIR target based on other quality target parameters such as the bit error rate (BER) or frame error rate (FER) or any other similar quality target the connection should meet.

In the embodiments a first station may transmit data or a request or an enquiry to a second station. After reception of said transmission the second station then transmits a response back to the first station. To improve the reliability and/or optimise the use of resources, information associated with at least one parameter for the response is signalled from the first station to the second station. This parameter may, for example, associate with the required power levels of the response and/or the number of times the response shall be transmitted and so on. The response signalling is then performed based on the received information.

In the FIG. 1 example the first station is the base station BS1 and the second station is the mobile station MS1. For example, when the base station BS1 allocates a channel to the mobile station MS1 and sends data thereto on the high speed data shared channel (HS-DSCH), the base station BS1 expects the mobile station to return an acknowledgement (ACK).

The base station BS1 may provide the mobile station with information on an associated control channel (either dedicated or shared) regarding the power levels required for the response. In a preferred embodiment the information provides the mobile station MS1 with an offset value. The offset value indicates the difference in power relative to power level used for transmission in the best uplink with the base station BS2. The base station MS1 determines the offset that is needed for the reliable acknowledgement transmission from the mobile station MS1 based on one or more measurements associated with transmissions from the mobile station. The power is determined such that a predefined level of reliability is obtained for the decoding of the acknowledgement at the base station BS1.

The mobile station MS1 is provided with appropriate power control entity PC. A per se known power control entity can be adapted to incorporate a feature that enables adjustment of the response transmission power levels based on the information received from the base station BS1. That is, the power control entity of the mobile station may make a decision that the response transmission needs to be accomplished in a different power level than what is used or communication with the best base station BS2 and control the transmission accordingly The acknowledgement message (ACK) may be transmitted back to the base station BS1 on a dedicated channel. The dedicated channel may be 'on' all the time even if there is no acknowledgements to be sent. This is so in order to keep the closed loop power control running. The active base station BS1 may measure a quality parameter such as the signal to interference ratio (SIR) of this dedicated channel for overall power control purposes. This may be done e.g. based or so called pilot bits that are transmitted by the mobile station. Thus the base station BS1 can calculate a required power offset. The power offset requirement is signalled from the base station BS1 to the mobile station MS1 with the downlink data packet to tell the mobile MS1 how much more power is required for the acknowledgement transmission.

New signalling bits may be added in the downlink transmission from the base station BS1 to tell the required power offset for the user equipment MS1. These bits may be sent, e.g., on the shared control channel since only the user equipment or those user equipment receiving on the downlink shared data channel need to send the acknowledgement ACK. That is, this information is not needed all the time, but only when there is data packets to acknowledge. Alternatively, the base station may sent these bits to the user equipment via a dedicated control channel or dedicated data channel.

The power control may be accomplished in a slot by slot basis in access techniques wherein the transmissions occur in slots.

A transmission can be divided into the slots e.g. based on time or by means of a spreading code. The mobile station MS1 may be adapted to assign power for the slots in accordance with a "normal" power control mechanism unless the mobile station has been provided with information which requires use of a different power level for a slot (or several slots) that are allocated for the response.

In a simple case one bit may be enough for the provision of the above referenced information. For example, '0' could indicate that an offset of 5 dB is required and '1' could indicate an offset of 10 dB. According to another possibility '0' could indicate that no offset is required and '1' could indicate that a predefined additional power is required.

2 to 4 bits may be used in a typical application for defining 4 to 16 different power offset levels. A step between the different power levels may be, for example, 2, 5 or 10 dB. Alternatively the step size between the power levels may be adapted to change nonlinearly.

Figure 3:
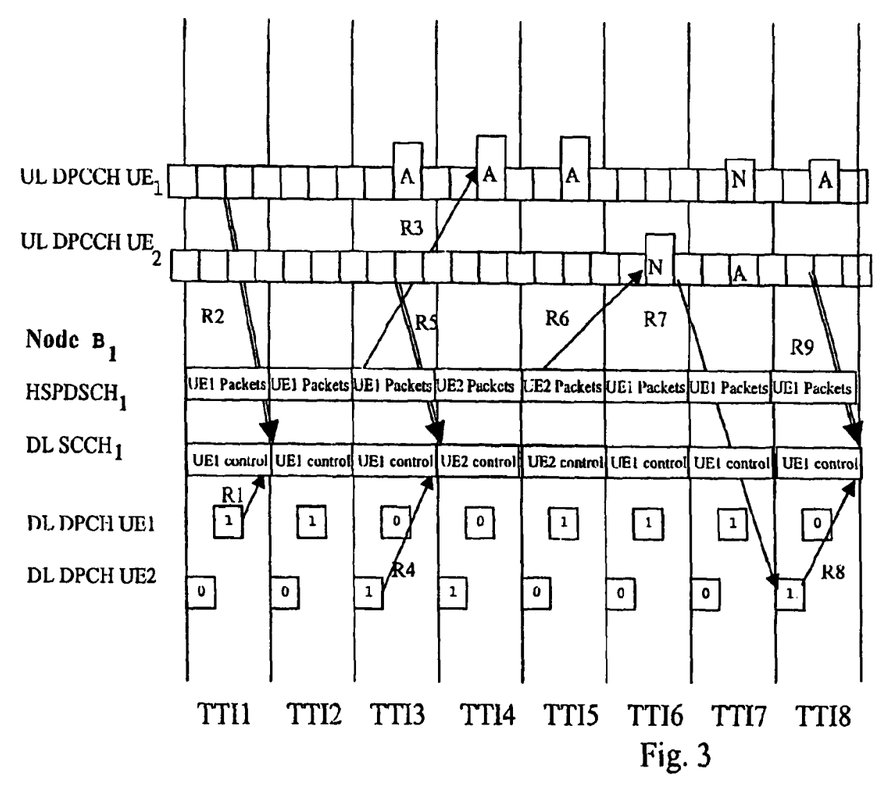
FIG. 3 shows a specific embodiment.

A more specific embodiment will now be described with reference to FIG. 3 showing transmission of data packets between a base station (node B) and two user equipment UE1 and UE2. It shall be appreciated that although FIG. 3 shows channels in association with only one base station, a plurality of base stations may have communication channels with the user equipment UE1 and/or UE2 at the same time. Other channels are, however, not shown for reasons of clarity.

A number of packets is shown to be transmitted to a first user equipment UE1 and to a second user equipment UE2 on the data channel HSPDSCH. The vertical lines of FIG. 3 dividing the transmission into sections indicate a high speed downlink packet access transmission time intervals (HSDPA TTI). The HSDPA TTI is a collection of a defined number of slots. That is, the high speed downlink packet access transmission time interval (TTI) defines a period for data transportation between user equipment and a base station via the high speed downlink shared channel (HSDSCH). Logically the TTI can thus be seen to correspond the concept of data frames. In the FIG. 3 example eight TTIs are shown, each TTI being three slots in length.

In the following it is assumed that the acknowledgements are provided in accordance with the fast hybrid automatic repeat request (HARQ) scheme. A so called N-channel HARQ is also assumed to be used for the fast HARQ together with a so called stop-and-wait protocol. The stop-and-wait protocol may be used in order to reduce buffering requirements of the receiving station.

The N-channel HARQ supports asynchronous transmission. Thus different users can be scheduled freely without need to wait for completion of a given transmission. The receiving station may need, however, to know to which HARQ process the packet belongs to. This information can be explicitly signalled on a high speed downlink packet access (HSDPA) control channel (CH), e.g. the SCCH. For example, after three packets have been transported to the first user equipment UE1, two packets may be transmitted to the second user equipment UE2. The transmission to the first user equipment UE1 may in such case be delayed by two TTIs. The processing times of data packet to different user equipment should be defined such that continuous transmission to a user equipment is possible.

Each packet is preferably acknowledged during the transmission of other packets so that the downlink (DL) channel can be kept occupied all the time when there are packets to be transmitted.

In FIG. 3 the uplink acknowledgements are shown to be transmitted on the dedicated physical control channel (DPCCH). Arrows R1 to R9 indicate various relations between different operations. That is, relations between pointer bits on the DL DPCH, shared data and control channel (HS-PDSCH and SCCH) transmission and the acknowledgement transmissions.

More particularly, each of the double lined arrows R2, R5 and R9 indicates a quality measurement performed for the uplink of a given user equipment on the respective dedicated control channel. The single lined arrows R1, R4 and R6 indicate the relationships between the pointer bits and shared control channel SCCH in the downlink. The single lined arrows R3 and R6 indicate the relationships between the downlink data channel HSPDSCH and acknowledgements in the uplink. The acknowledgements are transmitted with a power that has been adjusted based on information received on the SCCH, that is based on the results of the measurements.

During the first interval TTI1 the base station transmits a pointer bit to the user equipment UE1. The pointer bit indicates that the user equipment UE1 shall receive data and control information during the next TTI (TTI2) on the HS-PDSCH and on the SCCH. Also during TTI1, the base station measures the quality of the uplink of the user equipment UE1. These relations are shown by the relation arrows R1 and R2, respectively.

For example, the SIR of the uplink can be measured from the dedicated pilot symbols transmitted on the DPCCH in every slot. Based on this quality measurement, the base station provides the user equipment UE1 in the TTI2 with information regarding the power level that should be used when transmitting the acknowledgement during TTI4. This relation is indicated by arrow R3. The power level information can be provided as a power offset, as explained above. This power offset information may be, for example, provided as a field of a few bits in the shared control channel (SCCH).

It should be noted that the measurements may be averaged over a longer period of time or otherwise processed. The arrow R3 simply shows that the power offset used for the transmission is based on the measurement(s) done before the transmission of the power offset.

After having received the power level information the user equipment UE1 sends the acknowledgement using a power level that is based on information from the base station. The acknowledgement may be a positive acknowledgement (A in FIG. 3) or a negative acknowledgement (N in FIG. 3).

In FIG. 3, some of the acknowledgement slots are shown to be higher in order to illustrate that increased transmit power is used for these acknowledgements. The increased power may be applied for the whole slot or only on the acknowledgement bits within the slot. The same increased power may also be used in other slots if they contain other information such as measurement or quality report which is sent only to the same base station as the acknowledgement. The increased power may also be applied to the entire TTI or even a number of TTIs.

In addition to relations R1 to R3, FIG. 3 illustrates also a second set of relations R4 to R9 that associate with the user equipment UE2. In this case the acknowledgement was negative (N) and therefore a new pointer bit was given on the DL CPCH channel of the second user equipment UE2 for retransmission of the message.

In order to ensure that the power level for the response can be determined appropriately by the base station the uplink quality measurement is preferably accomplished as late as possible. As shown, information associated e.g. with the measurement as indicated by the arrow R2 is transmitted in the next transmission time interval (TTI2) on the control channel (DLSCCH).

The embodiments are especially suitable for acknowledgements because the acknowledgements need to be sent in response to a downlink transmission and also because the reliability of the acknowledgement transmission should be high.

The message specific control information may be signalled only when the first station determines that a different parameter is needed in order to ensure a reliable response by the user equipment.

Figure 4:
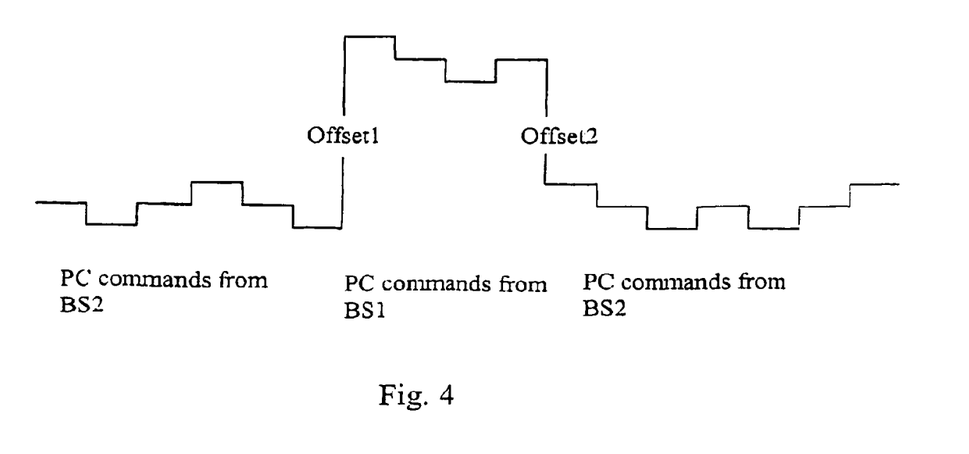
FIG. 4 shows power control commands from various base stations.

FIG. 4 shows a further embodiment in which the user equipment first follows power commands from the strongest base station, that is from a base station BS2. Another base station BS1 sends a 'power offset1' message to the user equipment. After having received the 'power offset1' message the power control function of the user equipment starts to follow said other base station.

The user equipment power control may set its transmission power based on the message from the base station BS1 for a predetermined time. The user equipment may alternatively follow the commands from the base station BS1 as long as it has some information, such as acknowledgements or measurement reports or so on to be sent to this base station. The user equipment may also wait for new power offset information from any of the base stations it is in connection with. That is, a new offset such as the shown 'Offset2' will replace the previous offset parameter.

When the user equipment power control returns to the "normal" soft handover mode the user equipment may change (typically decrease) its power back to the level it used before receiving the offset command 'Offset1'. That is, the user equipment may start to follow the power control commands from the strongest base station BS2 having the best uplink with the user equipment. This may be accomplished by using offset parameter that equal with the first offset (i.e. offset2=offset1 in FIG. 4) informed by the base station BS1 or a predetermined second offset (offset2). The second offset may be a function of the said first offset. The second offset may also be informed by the base station BS2 having the best uplink.

In a further embodiment each base station in connection (for instance, in a soft handover) with the user equipment may continuously measure the quality of the uplink. In addition to or instead of the normal power control commands each of the base stations may send power offset information to the user equipment telling how much the power should be changed (increased or decreased) in order to meet the quality target. This information is preferably sent on the dedicated control channel. In a normal soft handover case the user equipment may then use the offset that results in the lowest transmission power or alternatively follow the normal power control commands. However, when the user equipment has something to send to one base station only, the user equipment may then use the power offset sent by that base station. The offset may be sent periodically, e.g., in each slot as the power control commands, or once per every n slots and so on. The offset information may also be sent when needed, e.g., when the value of the offset exceeds some threshold values.

In an embodiment the user equipment may also be forced to use stronger coding for the transmission of the acknowledgement message. For example, the user equipment may be instructed to transmit the acknowledgement repeatedly. For example, instead of sending the acknowledgement once the user equipment may be instructed to transmit the acknowledgement three, five, or ten times and so on. According to an embodiment the user equipment is instructed to transmit the acknowledgement e.g. in three slots instead of one slot so that the acknowledgement can be decoded reliably.

The above discussed transmission parameter information provision mechanism may also be used in connection with other signalling functions than acknowledgements. The response messages could be, for example, measurement reports or other reports. The herein proposed signalling mechanism may be especially advantageous if a report is requested by a base station of a plurality of base stations in communication with a user equipment. The base station may inform the user equipment of the power offset and/or any other parameter that is to be used for the response towards the specific base station.

The above discussed adjustment of at least one feature of the response signalling based on information from power level measurements. The adjustment may also be based on other information that associates with the interface between the two stations. For example, the base station BS1 may request for a certain power offset based on analysis of the previous responses from the mobile station MS1. If the analysis indicates that a certain number of responses has not been correct, the offset may be increased in order to improve the reliability. The responses may be earlier ACKs or other data transmitted from the user equipment, e.g., speech packets.

It is noted that the above disclosed solution is applicable also in instances where the first message is sent from the user equipment to a base station. In such a case the user equipment may inform the base station of any requirements that it may have for the response from the base station.

It shall be appreciated that whilst embodiments of the present invention have been described in relation to mobile stations, embodiments of the present invention are applicable to any other suitable type of user equipment.

It shall be appreciated that whilst embodiments of the present invention have been described in relation to a mobile station that is in communication with more than one base station, the present invention is applicable also to instances where only two station are in communication with each other.

For example, a first station transmitting a message that is to be responded by a second station may insert in the message information regarding e.g. coding and/or power that is to be used for responding to the particular packet.

It shall be appreciated that while this specification mentions some system specific examples of the communication channels the embodiments of the invention are not restricted by these examples.

The response may also be sent, for example, on a shared control channel or a data channel in systems where such a channel is defined. A specific acknowledgement channel may also be defined.

The data is described as being in packet form. In alternative embodiments of the invention the data may be sent in any suitable format.

In addition, it is not always necessary to measure the quality of the connection for each data packet and/or to provide the user equipment with the offset information each time a response is required. Instead, the measurement may be accomplished and/or information transmitted e.g. in predefined intervals or in response to a predefined event (e.g. the quality of the connection has changed or the user equipment has been relocated from a network controller to another network controller and so on). It may thus be enough if the offset information is provided once for the user equipment during a connection between the user equipment and a base station.

The embodiment of the present invention has been described in the context of a CDMA system. This invention is also applicable to any other access techniques including time division multiple access, frequency division multiple access or space division multiple access as well as any hybrids thereof.

It shall be appreciated that the base station may in some communication standards, such as those associated with the $3^{rd}$ generation (3G) universal mobile telecommunications system (UMTS), be referred to as node B. However, this specification has used the term base station for clarity.

According to an alternative solution for the above discussed problem a dedicated physical channel (DPCH) is used only in association with a high speed downlink shared channel (HS-DSCH). That is, no other data is transmitted on the DPDCH. The power control of the DPCH may then follow base station that transmits on the active HS-DSCH (both in the uplink and the downlink) instead of the best base station. If no other data is transported on the uplink DPDCH, then the uplink power control function of the mobile station could follow the active high speed data base station. In such a situation information regarding the power offset may not be needed for the uplink, since the power control function may adjust the power.

It is also noted herein that while the above describes exemplifying embodiments of the invention, there are several variations and modifications which may be made to the disclosed solution without departing from the scope of the present invention as defined in the appended claims.

The invention claimed is:
1. A method comprising:
receiving at a device in simultaneous communication with a plurality of stations via a wireless interface power control commands from said plurality of stations;
receiving from a control unit further control information associated with a transmission parameter for use by said device for one or more transmissions to one of said plurality of stations other than the station that receives transmissions from said device with a best quality parameter; and controlling at lesat one transmission from said device to said one of said plurality of stations on the basis of a power control command from the station that receives transmissions from said device with the best quality parameter, and on the basis of said further control information received from the control unit, wherein the further control information comprises a control command selected from a plurality of control commands by the control unit.

2. A method according to claim 1, wherein the further control information includes power offset information regarding how much more transmission power is to be used for at least one transmission from said device to said one of said plurality of stations.

3. A method according to claim 2, wherein the power offset information indicates whether no offset is required or whether a predefined additional power is required.

4. A method according to claim 2, wherein the power offset information indicates whether an offset of a first value is required or whether an offset of a second value is required.

5. A method according to claim 1, wherein the further control information specifies the use of stronger coding for said at least one transmission from said device to said one of said plurality of stations.

6. A method according to claim 1, wherein the further control information includes an instruction to repeat the the said at least one transmission to said one of said plurality of stations an increased number of times.

7. A method according to claim 1, wherein said at least one transmission from said device to said one of said plurality of stations includes an acknowledgement of data received at said device from said one of said plurality of stations.

8. A method according to claim 7, wherein the at least one transmission from said device to said one of said plurality of stations includes an acknowledgement of data received from said one of said plurality of stations on a high speed data shared channel (HS-DSCH).

9. A method according to claim 1, wherein said at least one transmission from said device to said one of said plurality of stations station includes a measurement report or a quality report.

10. A method according to claim 1, wherein the further control information is sent in response to a predefined event.

11. A method according to claim 1, wherein the further control information is provided once for the device during a connection between the device and a base station.

12. A method according to claim 1, wherein the at least one transmission to said one of said plurality of stations includes responses to messages from said one of said plurality of stations, and wherein said further control information is provided each time a response is required.

13. A method according to claim 12, wherein the further control information is inserted in each message to which a response is required.

14. A method according to claim 12, wherein the messages from said one of said plurality of stations are provided on a data channel, and wherein the further control information is provided on an associated control channel.

15. A method according to claim 1, wherein the at least one transmission to said one of said plurality of stations includes responses to messages from said one of said plurality of stations on a data channel, and wherein said further control information is provided on a control channel associated with said data channel.

16. An apparatus, comprising:
a receiver configured to receive power control commands from a plurality of stations with which the apparatus is in simultaneous communication via a wireless interface, the receiver configured to receive from a control unit further control information associated with a transmission parameter for use by the apparatus for at least one transmission to one of said plurality of stations other than the station that receives transmissions from said apparatus with a best quality parameter; and
a controller configured to control at least one transmission from said apparatus to said one of said plurality of stations on the basis of a power control command from the station that receives transmissions from said apparatus with the best quality parameter, and on the basis of said further control information received from the control unit, wherein the further control information comprises a control command selected from a plurality of control commands by the control unit.

17. An apparatus according to claim 16, wherein the further control information includes power offset information regarding how much more transmission power is to be used for at least one transmission from said apparatus to said one of said plurality of stations.

18. An apparatus according to claim 17, wherein the power offset information indicates whether no offset is required or whether a predefined additional power is required.

19. An apparatus according to claim 17, wherein the power offset information indicates whether an offset of a first value is required or whether an offset of a second value is required.

20. An apparatus according to claim 16, wherein the further control information specifies the use of stronger coding for said at least one transmission from said apparatus to said one of said plurality of stations.

21. An appartus according to claim 16, wherein the further control information includes an instruction to repeat said at least one transmission to said one of said plurality of stations an increased number of times.

22. An apparatus according to claim 16, wherein said at least one transmission from said apparatus to said one of said plurality of stations includes an acknowledgement of data received at said apparatus from said one of said plurality of stations.

23. An apparatus according to claim 22, wherein the at least one transmission from said apparatus to said one of said plurality of stations includes an acknowledgement of data received from said one of said plurality of stations on a high speed data shared channel (HS-DSCH).

24. An apparatus according to claim 16, wherein said at least one transmission from said apparatus to said one of said plurality of stations includes a measurement report or a quality report.

25. An apparatus according to claim 16, wherein the further control information is sent in response to a predefined event.

26. An apparatus according to claim 16, wherein the further control information is provided once for the apparatus during a connection between the apparatus and a base station.

27. An apparatus according to claim 16, wherein the at least one transmission to said one of said plurality of stations includes responses to messages from said one of said plurality of stations, and wherein said further control information is provided each time a response is required.

28. An apparatus according to claim 27, wherein the further control information is inserted in each message to which a response is required.

29. An apparatus according to claim 27, wherein the messages from said one of said plurality of stations are provided on a data channel, and wherein the further control information is provided on an associated control channel.

30. An apparatus according to claim 16, wherein the at least one transmission to said one of said plurality of stations includes responses to messages from said one of said plurality of stations on a data channel, and wherein said further control information is provided on a control channel associated with said data channel.

31. An apparatus for use in a system in which a device is in simultaneous communication with a plurality of stations via a wireless interface and receives power control commands from said plurality of stations, wherein the apparatus comprises:
a control unit configured to provide the device with further control information associated with a transmission parameter for use by said device for one or more transmissions to one of said stations other than the station that receives transmissions from said device with a best quality parameter, and
wherein the further control information comprises a control command selected from a plurality of control commands by the control unit, and is used by the device together with a power control command from the station that receives transmissions from said device with the best quality parameter to control at least one transmission from said device to said one of said plurality of stations.

32. An apparatus according to claim 31, wherein the further control information includes power offset information regarding how much more transmission power is to be used for at least one transmission from said device to said one of said plurality of stations.

33. An apparatus according to claim 32, wherein the power offset information indicates whether no offset is required or whether a predefined additional power is required.

34. An apparatus according to claim 32, wherein the power offset information indicates whether an offset of a first value is required or whether an offset of a second value is required.

35. An apparatus according to claim 31, wherein the further control information specifies the use of stronger coding for said at least one transmission from said device to said one of said plurality of stations.

36. An apparatus according to claim 31, wherein the further control information includes an instruction to repeat the said at least one transmission to said one of said plurality of stations an increased number of times.

37. An apparatus according to claim 31, wherein said at least one transmission from said device to said one of said plurality of stations includes an acknowledgement of data received at said device from said one of said plurality of stations.

38. An apparatus according to claim 37, wherein the at least one transmission from said device to said one of said plurality of stations includes an acknowledgement of data received from said first station on a high speed data shared channel (HS-DSCH).

39. An apparatus according to claim 31 wherein said at least one transmission from said device to said one of said plurality of stations includes a measurement report or a quality report.

40. An apparatus according to claim 31, wherein the further control information is sent in response to a predefined event.

41. An apparatus according to claim 31 wherein the further control information is provided once for the device during a connection between the device and a base station.

42. An apparatus according to claim 31, wherein the at least one transmission to said one of said plurality of stations includes responses to messages from said one of said plurality of stations, and wherein said further control information is provided each time a response is required.

43. An apparatus according to claim 42, wherein the further control information is inserted in each message to which a response is required.

44. An apparatus according to claim 42, wherein the messages from said one of said plurality of stations are provided on a data channel, and wherein the further control information is provided on an associated control channel.

45. An apparatus according to claim 31, wherein at least one transmission to said one of said plurality of stations includes responses to messages from said one of said plurality of stations on a data channel, and wherein said further control information is provided on a control channel associated with said data channel.

46. A method for use in a system in which a device is in simultaneous communication with a plurality of stations via a wireless interface and receives power control commands from said plurality of stations; wherein the method includes:
providing the device with further control information associated with a transmission parameter for use by said device for at least one transmission to one of said stations other than the station that receives transmissions from said device with a best quality parameter,
wherein the further control information comprises a control command selected from a plurality of control commands by a control unit, and is used by the device together with a power control command from the station that receives transmissions from said device with the best quality parameter to control at least one transmission from said device to said one of said plurality of stations.

47. A method according to claim 46, wherein the further control information includes power offset information regarding how much more transmission power is to be used for at least one transmission from said device to said one of said plurality of stations.

48. A method according to claim 47, wherein the power offset information indicates whether no offset is required or whether a predefined additional power is required.

49. A method according to claim 47, wherein the power offset information indicates whether an offset of a first value is required or whether an offset of a second value is required.

50. A method according to claim 46, wherein the further control information specifies the use of stronger coding for said at least one transmission from said device to said one of said plurality of stations.

51. A method according to claim 46, wherein the further control information includes an instruction to repeat the said at least one transmission to said one of said plurality of stations an increased number of times.

52. A method according to claim 46, wherein said at least one transmission from said device to said one of said plurality of stations includes an acknowledgement of data received at said device from said one of said plurality of stations.

53. A method according to claim 52, wherein the at least one transmission from said device to said one of said plurality of stations includes an acknowledgement of data received from said one of said plurality of stations on a high speed data shared channel (HS-DSCH).

54. A method according to claim 46, wherein said at least one transmission from said device to said one of said plurality of stations includes a measurement report or a quality report.

55. A method according to claim 46, wherein the further control information is sent in response to a predefined event.

56. A method according to claim 46, wherein the further control information is provided once for the device during a connection between the device and a base station.

57. A method according to claim 46, wherein the at least one transmission to said one of said plurality of stations includes responses to messages from said one of said plurality of stations, and wherein said further control information is provided each time a response is required.

58. A method according to claim 57, wherein the further control information is inserted in each message to which a response is required.

59. A method according to claim 57, wherein the messages from said one of said plurality of stations are provided on a data channel, and wherein the further control information is provided on an associated control channel.

60. A method according to claim 46, wherein the at least one transmission to said one of said plurality of stations include responses to messages from said one of said plurality of stations on a data channel, and wherein said further control information is provided on a control channel associated with said data channel.

* * * * *